US008705805B2

(12) United States Patent
Forrest

(10) Patent No.: US 8,705,805 B2
(45) Date of Patent: Apr. 22, 2014

(54) SECURE PORTABLE TOKEN AND SYSTEMS AND METHODS FOR IDENTIFICATION AND AUTHENTICATION OF THE SAME

(75) Inventor: Peter A. Forrest, Perth (AU)

(73) Assignee: Peter Alexander Forrest, Perth (AU)

( * ) Notice: Subject to any disclaimer, the term of this patent is extended or adjusted under 35 U.S.C. 154(b) by 441 days.

(21) Appl. No.: 12/930,517

(22) Filed: Jan. 10, 2011

(65) Prior Publication Data

US 2012/0177255 A1 Jul. 12, 2012

(51) Int. Cl.

| | |
|---|---|
| ***G06K 9/00*** | (2006.01) |
| *G06K 9/46* | (2006.01) |
| *G01N 21/00* | (2006.01) |
| *G01J 4/00* | (2006.01) |

(52) U.S. Cl.

USPC .............. 382/109; 356/30; 356/364; 382/190

(58) Field of Classification Search

None

See application file for complete search history.

(56) References Cited

U.S. PATENT DOCUMENTS

| | | | | |
|---|---|---|---|---|
| 4,476,468 | A | 10/1984 | Goldman | |
| 5,619,025 | A | 4/1997 | Hickman et al. | |
| 6,396,941 | B1 * | 5/2002 | Bacus et al. | 382/128 |
| 6,570,648 | B1 * | 5/2003 | Muller-Rees et al. | 356/71 |
| 6,628,439 | B2 * | 9/2003 | Shiozawa et al. | 359/2 |
| 7,353,994 | B2 * | 4/2008 | Farrall et al. | 235/454 |
| 2002/0034618 | A1 * | 3/2002 | Moshrefzadeh et al. | 428/206 |
| 2005/0277710 | A1 * | 12/2005 | Joyce et al. | 523/210 |
| 2006/0124741 | A1 * | 6/2006 | Mayer et al. | 235/454 |
| 2009/0217813 | A1 * | 9/2009 | Carberry et al. | 89/36.02 |

FOREIGN PATENT DOCUMENTS

| | | | |
|---|---|---|---|
| AT | 207138 B | | 1/1960 |
| AT | 264871 B | | 9/1968 |
| DE | 10007466 | | 3/2002 |
| DE | 102007020982 | | 10/2008 |
| GB | 2218044 | | 11/1989 |
| WO | 2004011273 | | 2/2004 |
| WO | 2007031077 | | 3/2007 |
| WO | 2008153503 | | 12/2008 |
| WO | WO 2010040180 A1 | * | 4/2010 |

OTHER PUBLICATIONS

Savile Bradbury; Mortimer Abramowitz; Michael W. Davidson, Microscope Configuration, (Apr. 17, 2009), Olympus, <http://web.archive.org/web/20090417044507/http://www.olympusmicro.com/primer/techniques/polarized/configuration.html>.*

International Search Report and Written Opinion for PCT/EP2012/050191 dated Apr. 3, 2012.

Search Report and Written Opinion in NL2008084 dated Apr. 3, 2012.

Search Report Under Section 17(5) in GB1107723.7 dated Mar. 30, 2012.

* cited by examiner

*Primary Examiner* — Jason M Repko
*Assistant Examiner* — Carol Wang
(74) *Attorney, Agent, or Firm* — Banner & Witcoff, Ltd.

(57) ABSTRACT

A portable token and systems and methods for identification and authentication of the same are disclosed. The portable token may be utilized for a variety of purposes and uses a thin section of rock as a unique identifying element, which is extremely resistant to forgery or duplication. Identification and authorization of tokens is achieved by a system that uses optical examination of the microstructure and the refractive properties of crystalline minerals within the identifying element, by transmitted polarized light techniques. Comparison between stored reference data and acquired examination data is the basis for verifying authenticity. The naturally-occurring three-dimensional orientations of the optical axes of mineral crystals contribute to the identification information by their effects.

10 Claims, 3 Drawing Sheets

SECURE PORTABLE TOKEN AND SYSTEMS AND METHODS FOR IDENTIFICATION AND AUTHENTICATION OF THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

The invention relates to systems and methods for identifying and authenticating portable tokens, typically used to control access, by a person, to an entity, a benefit or a process. Another area of use is in the association of a token with one or more entities as an indicator of valid registration or allowance. The technical fields of transmitted-light optics, data-storage and handling, petrology, polarizing microscopes and crystallography are relevant to the invention.

2. Description of the Related Art

Identifying and authenticating tangible articles, particularly high-value items, as being genuine is an important function that has a long history as prior art. The art of photography and, more recently, electro-optical image recording, has enabled comparisons between an original and a suspect object, as exemplified in U.S. Pat. No. 5,521,984, where a reflected light microscope is used to make an image of very fine detail of subjects such as paintings, sculptures, stamps, gemstones, or of an important document. Forgery of an original work, or of an anti-counterfeiting device that is associated with goods of generally similar appearance, is a driving force for the art of authentication systems.

Though biometric and fingerprint identification systems may supersede many token-based access-control systems, an agreement without a document or a physical device has little weight in law: documents and devices are likely to persist as bonds of valid registration, allowance or entitlement.

The rates of 'false-accepts' and 'false-rejects' are important to the utility of any authentication system and closely related to the value of the entity or situation being controlled or to the security level required. A high 'false-reject' rate will lose consumer-confidence in the system, affecting both parties. A high-security facility or a passport-control may generally tolerate higher 'false-rejects,' to the inconvenience of some person, with no 'false-accepts.' Similarly, for very high value items both rates should be close to zero. The examination and comparison processes can be precise and accurate, as exemplified in the U.S. Pat. No. 5,521,984 previously referred to, leaving overall security weakness in identification in the domain of the data-handling and storing processes employed.

The field of anti-counterfeiting devices for mid-price consumer goods and credit-cards has led to many inventions for two-dimensional devices for that market, including stamped transmission holograms and various improved diffractive optical devices. The utility of reflection holograms has some difficulties in cost and suitable materials: all holograms have limitations in scaling the subject matter. Some of these devices may be optically duplicated, however, and most have master dies that could be duplicated or misappropriated. In many cases these devices are read, the data is 'digested' and then compared to accompanying data. Abrasion-wear or flexing damage can cause problems with reading the authentic device and lead to higher 'false-rejects.' False-rejects' often require intervention by a human-being.

Some methods for device and document authentication use reflected coherent light as a method of obtaining a characteristic signature of the subject, as exemplified in U.S. Pat. No. 7,812,935. Generally, methods using speckle, complex diffractions or refraction have to contend with minor changes, unconnected with any fraud, causing large alterations in presented properties when read. The minor changes could occur at all points in the subject, e.g. thermal expansion, stress-fracturing, scratches or color-fading; this creates difficulties in establishing identity without using multiple application of statistical percentiles to develop pass criteria, or may require data-digests to be made from encoding schemes held within the reading device.

The use of a third dimension, usually depth, in a security device is exemplified in U.S. Pat. No. 4,825,801, where glitter and dye-balls in a hardened resin, as a seal, practically defies successful duplication. This latter example's high-security application permits adequate time for the examination process. Subsequently, various multiple objects have been set in 'hardenable' liquids: by example, U.S. Pat. No. 7,353,994. Qualitatively these seem to be strong devices; quantifying the spatial features in them however, in a reading device, can be problematic.

The prior art of creating unique arrangements in a relatively thin security device also includes U.S. Pat. No. 7,793,837, wherein a captive brittle layer in a consumer-card, such as a credit card, is intentionally shattered and the pattern of shards examined for authenticity.

BRIEF SUMMARY OF THE INVENTION

It is a primary object of the invention to provide a portable-token identification and authentication system, which is more reliable and more often correct at determining identity and authenticity of the portable token than prior systems and methods of the art.

Another object of the invention is to provide a portable token that, once fabricated, cannot be duplicated by any person, including the original manufacturer, or by using his data, equipment, materials or knowledge: forgery of any of these portable tokens that the systems and methods could determine as being authentic is considered to be near impossible by any practical means.

A further object of the invention is to provide a portable token with a security element that is resistant to color-fading, heat, cold, abrasion, shock and other physical effects that it may encounter in normal handling. Conversely, another object is to be more able to disclose interference with the token than prior systems and methods: forgery attempts principally.

The invention uses a thin planar section of naturally-occurring rock of the Earth's crust as an element subject to identification, being contained within an essentially transparent and portable token. The planar rock section is sufficiently thin to transmit light through the majority of the rock-forming minerals within. Image-forming optics are used with polarized light to form and record luminance, color and chromaticity image-data of the detailed assemblage of rock-forming minerals presented. These image data are then used as a basis for identifying and authenticating the token. Additionally, the invention uses the naturally-occurring three-dimensional orientations of the optical axes of mineral crystals, principally by their effects, to obtain further defining information for use in identifying and authenticating the token.

BRIEF DESCRIPTION OF THE SEVERAL VIEWS OF THE DRAWINGS

The drawings of this specification show 4 figures.

DETAILED DESCRIPTION OF THE INVENTION

Figure 1:
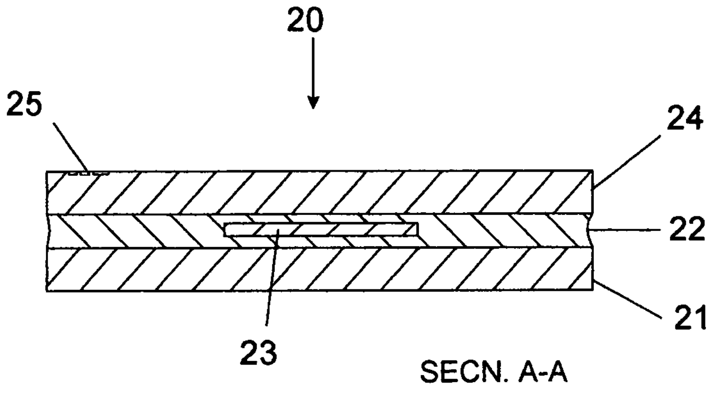
FIG. 1 depicts a cross-sectional view of an embodiment of a portable token. The cross-section is taken through the assembly shown in FIG. 2.

FIG. 1 depicts the cross-section of a portable token according to one embodiment of the invention; portable token 20 includes a transparent planar substrate layer 21, an adhesive that is essentially transparent to light rays 22, a planar section of naturally-occurring rock of the Earth's crust, of less than 250 micrometers in its least dimension, being in part or in whole transmissive of light rays in its least dimension 23, a transparent planar covering-plate layer 24 and markings 25, where the substrate layer 21 and covering-plate layer 24 are made of any of the class of materials that are transparent crystalline ceramics or partly-crystalline glass-ceramics, tending to confer strength, abrasion resistance and high optical clarity. The components of portable-token 20 are physically joined together by the optically clear adhesive 22, the planar section of rock 23 being within the adhesive component 22. The portable token thus described is, by choice of materials, substantially transparent to wavelengths of light between 250 and 800 nanometers, scratch-resistant, rigid, dimensionally stable and durable. In various embodiments, the portable token may be made physically strong, or it may be made more frangible to suit an application such as a security-seal element.

In one embodiment of the invention, the planar section of naturally-occurring rock is fashioned from igneous, metamorphic or sedimentary rock and is made to a thickness of thirty micrometers in its least dimension by the known prior art of manufacturing mineralogical 'thin-sections.' The term 'planar rock section' shall also be used to refer to item 23 in the Figures. In this same embodiment, the rock shall be selected as being unweathered intact rock that has the preferred properties of: a low proportion of opaque minerals; a substantial proportion of optically anisotropic minerals; and variety in mineral types. A metamorphic schist would typify these preferences for a source of rock, though most crustal rocks suffice. With regard to that same embodiment, the thickness of the planar rock section is sufficient to permit the use of a practicable radiant flux from light source 30 and a practicable sensitivity of the image recording device 38, while also preserving certain physical attributes of the planar rock section 23.

Figure 2:
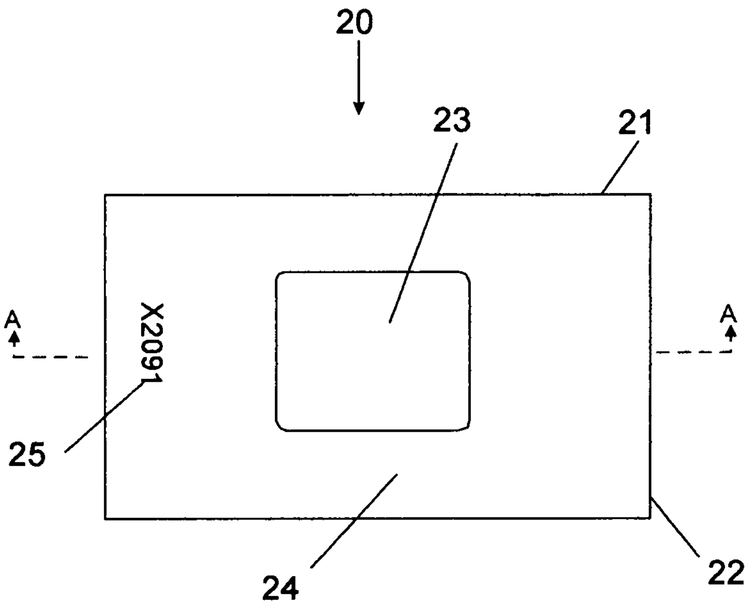
FIG. 2 depicts a plan view of an embodiment of a portable token, according to the invention.

FIG. 2 depicts a plan view of a portable token 20 according to one embodiment of the present invention, wherein the planar rock section 23 is surrounded by the adhesive 22, to seal it from the external environment. In this particular embodiment of the invention, markings 25 are present on or within the portable token; the markings depicted in FIG. 2 are only an example, the markings may be spatial references, alphanumeric symbols, graphical compositions, or encrypted data. A typical example of markings 25 would be a human-readable reference number for the portable token. In other embodiments of the invention, the portable token may have: a shape differing from the rectangular embodiment of FIG. 1 and FIG. 2; perforations; wave-retarding plates included; polarizing filters included; or colored transparent layers included.

Figure 3:
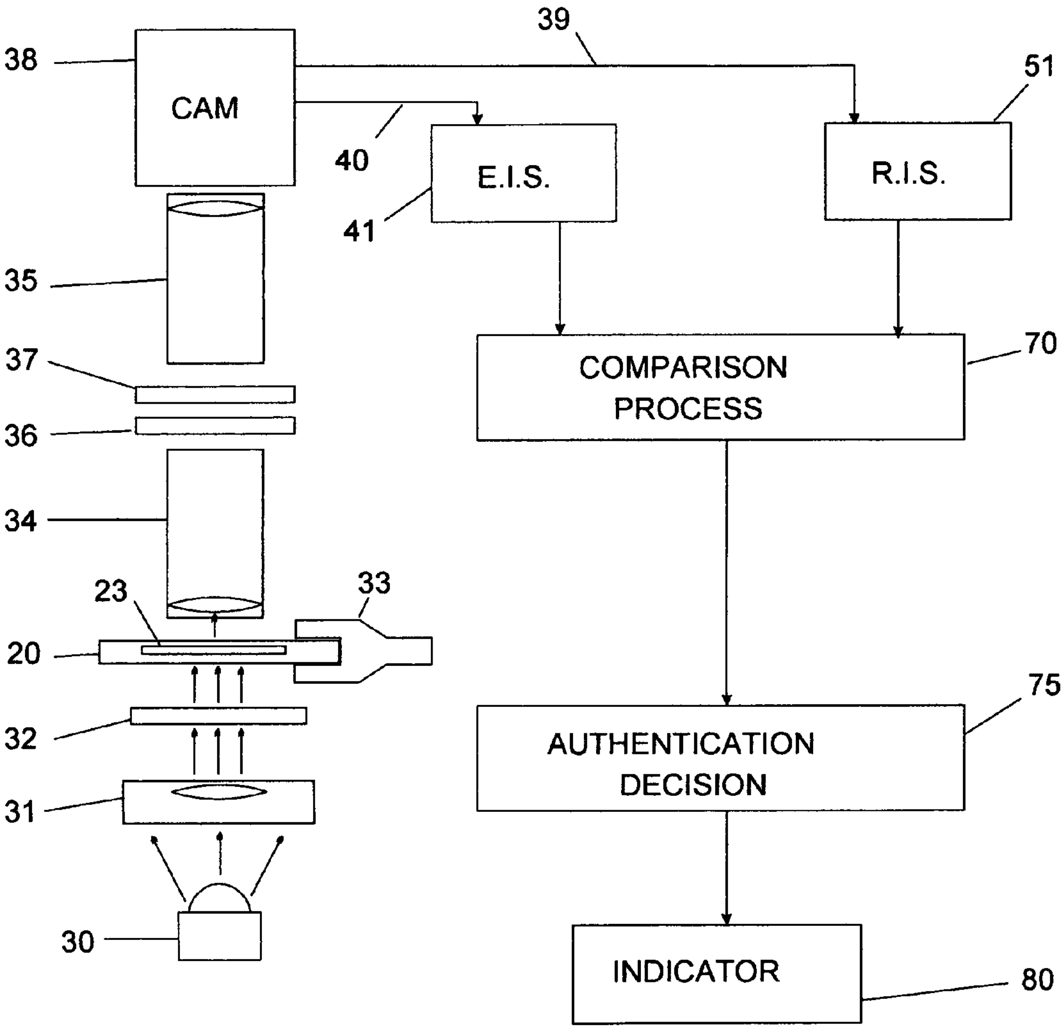
FIG. 3 depicts an embodiment of the invention in a schematic form: a system to identify and authenticate a portable token. The figure shows a portable token in an apparatus that performs optical examination of the token by transmitted light and shows paths of data through functional sub-systems. In this figure the data-paths for both reference-images and examination-images are shown; in this embodiment a photographic-plate camera is used.

An embodiment of the invention, in the form of a system for identifying and authenticating a portable token is depicted in FIG. 3, in which functional components, functional arrangements, functional blocks of the system and data-paths are shown. With reference to FIG. 3: a source of linear-polarized light is created by the combination of a light source 30, a means of directing light rays, shown as a condenser-lens assembly 31 and a linear-polarizing plate 32. The light source 30 may be monochromatic or polychromatic light, produced by known arts of light-sources. According with the known art of microscopy, the linear-polarizer 32 may also be below or within the condenser-lens assembly 31, and a variable aperture may be present in the condenser-lens assembly 31. Another embodiment of the invention may, by using a particular light source, be without a condenser-lens assembly 31. The linear-polarizer 32 may be rotated freely through 360 degrees, about an axis corresponding to the optical axis of the condenser lens, or the path of directed light rays, thus rotating its axis of polarization.

In FIG. 3, a portable token 20 is placed upon a supporting-stage 33; the latter may be translated in three axes, thus enabling translation of the portable token 20 in concert. Linear-polarized light is directed toward the planar rock section 23 in portable token 20. Notwithstanding the presence of any opaque minerals in it, light rays will be transmitted by planar rock section 23, in the direction of a means of generating an image. In FIG. 3, image-forming optics-part A, 34, and image-forming optics-part B, 35, comprise a means of generating an image, by known arts of microscope optics. In one embodiment of the invention, the combination of items 34 and 35 provides a magnification ratio of 30, at which a large amount of detail may be apparent in item 23, for practical use. In FIG. 3 a particular embodiment of the invention is shown, wherein a wave-retarding plate 36 and a linear polarizing plate 37 are interposed between items 34 and 35: in another embodiment of the invention the wave-retarding plate 36 may be absent, and in another embodiment of the invention the linear polarizing plate 37 may be absent. It is a practical point of configuration that items 36 and 37 be placed between the objective-lens assembly of item 34 and the ocular assembly of item 35, known to the prior art of polarizing microscopes: the items 36 and 37 may be positioned, in their depicted sequence, elsewhere in the light-path between the portable token 20 and the camera 38 to the same effect. An image formed by the components 34 and 35, from that light transmitted by portable token 20, is then recorded by a camera 38. In the embodiment of the invention shown in FIG. 3 the camera 38 is a photographic plate camera, from which photographic data is passed through data-paths 39 and 40, as recorded image data. In another embodiment of the invention, the translation of the portable token 20 in order to obtain different views of it by the camera 38 may be achieved by translating components 30, 31, 32, 34, 35, 36, 37 and 38 in concert while components 33 and 20 remain stationary, or by other combinations of relative translation.

The following is a descriptive note on the recorded image data obtained by a particular embodiment of the invention where white polychromatic light is emitted from item 30 and items 36 and 37 are absent, without limitation as to what is obtained therefrom. The recorded image data will typically show: irregular dark areas due to opaque minerals; a complex irregular pattern of lines due to mineral-grain boundaries; fractures; internal cleavage-planes; micro-voids; banding; assemblages of mineral-grains; gross crystal forms; and a range of luminances of individual mineral-grains. In this example, various anisotropic mineral-grains may show color, arising from the different absorption spectra of the ordinary and extraordinary rays in that mineral, in combination; any color in isotropic mineral-grains would arise from a sole absorption spectrum. The recorded image data may thus be described as maps of luminance or chromaticity, or as a combination of luminance and chromaticity representing color. If the polarization axis of item 32 is rotated, then the color and luminance of a particular anisotropic mineral-grain may be seen to change, providing that it is not being viewed in a direction parallel to an optic axis, of which there may be two; this color-change effect is pleochroism and may be used, qualitatively or Quantitatively, to further the identification of the token. In another embodiment of the invention, where the linear polarizing plate 37 is included and its polarization axis is aligned to be orthogonal to that of plate 32, transparent anisotropic mineral-grains may show luminance-variations under their relative rotation to the pair of polarizing plates and variations of color may be evident; these effects arise from velocity and phase differences between their ordinary and extraordinary rays leading to constructive or destructive interference at different wavelengths when re-combined by polarizing plate 37. Thus, using various embodiments of the invention, changing attributes for any particular point on a two-dimensional image, or map, may be observed between maps recorded under different relative rotations of the portable token 20 and the polarization axes of polarizing plates 32 and 37: these changes can be used qualitatively or quantitatively in identifying and authenticating the portable token.

In an embodiment of the invention depicted in FIG. 3, the system uses the principle of making a set of reference image data, typically under the control of a trusted entity, and then comparing subsequent image data from a portable-token subject to inquiry to that reference image data: substantial sameness is the basis for identifying and authenticating a portable token as being the original item. Referring to FIG. 3, image data from camera 38 is passed through data-path 39 when recorded as reference image data; image data from camera 38 is passed through data-path 40 when recorded as image data to be subject to inquiry. Reference image repository 51 is a storage of reference image data, which may be retrieved; examination image repository 41 is a storage of image data to be subject to inquiry, which may also be retrieved. A comparison process 70 retrieves recorded image data from reference image repository 51 and examination image repository 41. The comparison process 70 seeks a substantial sameness between members of the reference image data set and the members of the examination image data set, it may use various means to search, index, align, scale or register images, or any other action required. The comparison process 70 passes data to an authentication decision subsystem 75, which may also pass data back to item 70. The authentication decision subsystem 75 decides whether or not to declare the portable token 20 as authentic based, in the least, upon the data received from the comparison process 70. The authentication decision subsystem 75 may pass data back to the comparison process 70, for example, in the form of requests relating to comparison efforts. Data from the authentication decision subsystem 75 is passed to an indicator 80; the latter provides a binary logic indication indicative of a declaration by the decision subsystem 75. The indicator 80 may include: switches, binary state-transitions, or any other means of indication.

Figure 4:
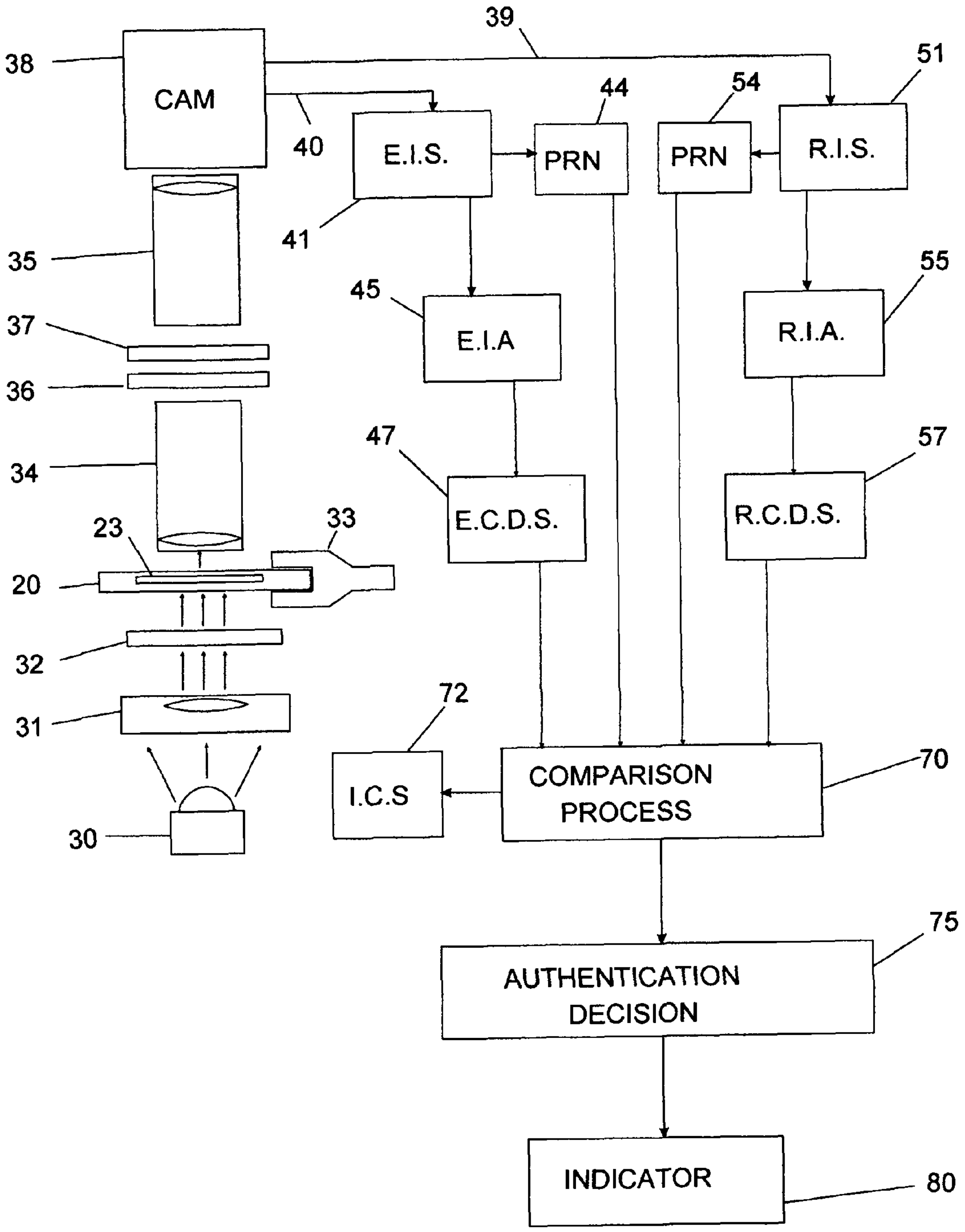
FIG. 4 depicts a second embodiment of the invention in a schematic form: a system to identify and authenticate a portable token. The figure shows a portable token in an apparatus that performs optical examination of the token by transmitted light and shows paths of data through functional sub-systems. In this figure the data-paths for both reference-images and examination-images are shown; in this embodiment an electro-optical type of camera is used and sub-systems that perform functions such as image-analysis are shown.

In an embodiment of the invention depicted in FIG. 4, image data from an electronic-imaging camera 38 is passed through data-path 39 when recorded as reference image data and through data-path 40 when recorded as image data to be subject to inquiry. Reference image repository 51 is a storage of reference image data, which may be retrieved; examination image repository 41 is a storage of image data to be subject to inquiry, which may also be retrieved. A photo-printer 44 is connected to examination image repository 41 and a photo-printer 54 is connected to reference image repository 51, both serve to make physical prints from digital image data. An image analysis subsystem 55 receives two-dimensional image data from the reference image repository 51 and measures and derives attributes and characteristics from a set of images pertaining to a particular token, it may use a computer processor and memory to do this. Image analysis subsystem 55 passes data of measurements, attributes and characteristics into reference-characteristic data repository 57. Similarly, an image analysis subsystem 45 receives two-dimensional image data from the examined image repository 41 and measures and derives attributes and characteristics from a set of images pertaining to a particular token subject to inquiry, it may use a computer processor and memory to do this. Image analysis subsystem 45 passes data of measurements, attributes and characteristics into examined-characteristic data repository 47. A comparison process 70 retrieves recorded image data as prints from photo-printer 54, for reference images, and from photo-printer 44, for examination images. The comparison process 70 seeks a substantial sameness between members of the reference image data set and the members of the examination image data set. Comparison process 70 also retrieves data of measurements, attributes and characteristics from reference-characteristic data repository 57 and examined-characteristic data repository 47, and seeks a substantial sameness between those data pertaining to a particular token.

In the particular embodiment depicted in FIG. 4, an imaging-control subsystem 72 is shown. Imaging-control subsystem 72 may receive commands from the comparison process 70 and may transmit commands to components 30, 31, 32, 33, 34, 35, 36, 37 and 38, with objects including: varying the brightness of item 30; varying the polarization-axis of item 32; varying the polarization-axis of item 37; achieving a relative translation of the planar rock section 23, to attain a different viewing area or focal point at the planar rock section 23; varying the focal points of the image-forming optics 34 and 35. The imaging-control subsystem 72 may, then, be used to direct and control the apparatus that acquires images of a portable token.

In other embodiments of the invention, data in data-paths or storage or repositories may be encrypted as a security measure; data also may be passed bi-directionally through the data-paths between functional sub-units of the system.

In other embodiments of the invention, the comparison process 70 may use a computer processor, a computer-readable memory and a processor instruction set to carry out its functions.

In other embodiments of the invention, image analysis subsystems 45 and 55 may use a computer processor, a computer-readable memory and a processor instruction set to carry out their functions or to store measured or calculated attributes.

In a particular embodiment of the invention, a wave-retarding plate 36 may be included which may, for example, improve measurements of color by presenting a higher 'order' of interference-colors having more saturated chromaticities.

In a particular embodiment of the invention, certain identifying attributes of one or more mineral grains may be derived to further the verification of identity. In such an embodiment, and using an illustrative example: the color exhibited by a particular mineral grain may change with changes in the angular value between the polarization-axis of the linear-polarized light source and a predetermined axis that is orthogonal to the least dimension of the planar rock section; by noting how this color, or luminance alone, changes with the angle a characteristic can be measured. Such colors may be matched to those in a color space and to a luminance scale: C.I.E.xyY could be used as an absolute color space in such an embodiment, one in which there are coordinates describing chromaticity and luminance. Coordinates from matching the color at each angular value can be put into sets, which may define vector-paths in the color space or luminance scale. Such coordinate sets or vector-paths protect against forgery of an, otherwise, two-dimensional image. When a set of vector-paths is made for a number of suitable mineral grains, they are correlated.

One or more features from any embodiment may be combined with one or more features of any other embodiment without departing from the scope of the disclosure. In this specification a recitation of 'a', 'an' or 'the' is intended to mean 'one or more,' unless specifically otherwise indicated.

The above description is provided to illustrate the main principles of the invention, by examples of various embodiments, and is not to be construed as restrictive. Variations or other embodiments within the scope of the disclosure of the invention may be apparent to those skilled in the art upon review of the foregoing disclosure. Thus, the scope of the disclosure of the invention shall be defined only by the full scope of the claims set forth below.

What I claim as my invention is:

1. A method of identifying and authenticating portable tokens, the method comprising the steps of:

(a) directing light from a polychromatic, or monochromatic, linear-polarized light source toward an essentially transparent portable token including a planar rock section of naturally-occurring rock of the Earth's crust of less than 250 micrometers in its least dimension and being in part or in whole transmissive of light rays in its least dimension;

(b) using a means of generating an image to form an image from that light which may be transmitted by the planar rock section through its least dimension;

(c) using a means of recording images, being either a photographic plate or an electronic image-recorder, to capture the light rays of the image and to record an image;

(d) storing the image data into one or more storage repositories for recorded reference images, as a reference to which later images recorded by the method may be compared;

(e) selecting a position in any particular mineral grain that exhibits a variation in luminance between images recorded with different angular values between the polarization-axis of the linear-polarized light source and a predetermined axis that is orthogonal to the least dimension of the planar rock section;

(f) allowing the passage of any amount of time, during which time the portable token may, or may not, be removed from the means of generating an image apparatus;

(g) the repeating of steps (a), (b) and (c) after the said passage of time, wherein the essentially transparent portable token is now subject to inquiry;

(h) storing the image data into one or more storage repositories of data of recorded images, as image data to be subjected to inquiry by a comparison process;

(i) comparing those recorded image data of the planar rock section that were recorded as a reference with those that were recorded for inquiry, by a comparison process, wherein the comparison process may use a computer-processor and memory;

(j) deciding upon the identity and authenticity of the portable token based upon a matching correspondence, or lack thereof, between the reference image data and the image data of the subject of inquiry;

(k) indicating, as a binary logic output, the decision as to whether or not the planar rock section in the portable token is authentic.

2. The method according to claim 1 with the additional step of interposing a linear-polarizer plate between the essentially transparent portable token and the means of recording images, such that those light rays emanating from the linear-polarized light source which may be transmitted by the planar rock section pass through the added linear-polarizer plate and into the means of generating an image.

3. The method according to claim 1 with the additional steps of:

(l) interposing a linear-polarizer plate between the essentially transparent portable token and the means of recording images, such that those light rays emanating from the linear-polarized light source which may be transmitted by the planar rock section pass through the added linear-polarizer plate and into the means of generating an image;

(m) positioning the added linear-polarizer plate such that its polarization axis is normal to the polarization axis of the linear-polarized light source;

(n) generating and recording a set of images pertaining to a particular portable token, of which each member corresponds to a particular angular value between the polarization-axis of the linear-polarized light source and a predetermined axis that is orthogonal to the least dimension of the planar rock section, to serve as reference images or subject-inquiry images.

4. The method according to claim 1 with the additional steps of:

(l) interposing a wave-retarding plate and a linear-polarizer plate between the essentially transparent portable token and the means of recording images, such that those light rays emanating from the linear-polarized light source which may be transmitted by the planar rock section pass through the added wave-retarding plate and the added linear-polarizer plate and, thereafter, into the means of generating an image;

(m) positioning the added linear-polarizer plate such that its polarization axis is normal to the polarization axis of the linear-polarized light source;

(n) generating and recording a set of images pertaining to a particular portable token, of which each member corresponds to a particular angular value between the polarization-axis of the linear-polarized light source and a predetermined axis that is orthogonal to the least dimension of the planar rock section, to serve as reference images or subject-inquiry images.

5. The method according to claim 1 with the additional steps of:

(l) matching the luminance of that mineral-grain position to a scale of luminance values or relative luminance values;

(m) noting the matching coordinates on the scale of luminance values or relative luminance values and recording said same;

(n) matching the chromaticity of that mineral-grain position to a chromaticity coordinate system map;

(o) noting the matching coordinates on the chromaticity coordinate system map and recording said same;

(p) matching the chromaticity and luminance of that mineral-grain position to a color-space coordinate system which represents chromaticity and luminance;

(q) noting the matching coordinates on the color-space coordinate system map and recording said same;

(r) noting the angular value between the polarization-axis of the linear-polarized light source and a predetermined axis that is orthogonal to the least dimension of the planar rock section;

(s) repeating steps (l), (m), (n), (o), (p), (q), and (r), in respect of the same particular mineral grain, for one or more images recorded with different angular values between the polarization-axis of the linear-polarized light source and a predetermined axis that is orthogonal to the least dimension of the planar rock section;

(t) combining the recorded coordinates from the scale of luminance values, or relative luminance values, with their corresponding recorded angular values to form a set of tuples that may represent a vector path in the coordinate space of the scale of luminance values used;

(u) combining the recorded coordinates from the chromaticity coordinate system with their corresponding recorded angular values to form a set of tuples that may represent a vector path in the coordinate space of the chromaticity coordinate system;

(v) combining the recorded coordinates from the color-space coordinate system with their corresponding recorded angular values to form a set of tuples that may represent a vector path in the coordinate system of the color-space;

(w) comparing the vector path data of those particular mineral-grain positions that are subject to inquiry with the corresponding vector data that was derived, by the same method, from recorded images of the planar rock section that were recorded as a reference;

(x) deciding upon the authenticity of the portable token based upon a matching correspondence or correlation, or lack thereof, between the set of reference image vector data and the set of vector data derived from the image data of the subject of inquiry;

(y) indicating, as a binary logic output, the decision as to whether or not the planar rock section in the portable token is authentic.

6. One or more non-transitory computer-readable media that are encoded with, or store, sets of instructions for a computer processor that when executed perform the method as recited in claim 5.

7. The method of claim 1 wherein the binary logic output of step (k) is included in a set of data that either allows or disallows access to an entity, to a benefit or to a process, by the bearer of the portable token.

8. The method of claim 1 wherein the binary logic output of step (k) is included in a set of data that either validates or invalidates an entitlement of the bearer of the portable token.

9. One or more non-transitory computer-readable media that are encoded with, or store, sets of instructions for a computer processor that when executed perform the method as recited in claim 1.

10. A system, comprising:

at least one processor; and memory coupled to the at least one processor and storing computer-readable instructions that, when executed by the at least one processor, cause the system to:

(a) direct light from a polychromatic, or monochromatic, linear-polarized light source toward an essentially transparent portable token including a planar rock section of naturally-occurring rock of the Earth's crust of less than 250 micrometers in its least dimension and being in part or in whole transmissive of light rays in its least dimension;

(b) form an image from that light which may be transmitted by the planar rock section through its least dimension;

(c) record images, being either a photographic plate or an electronic image-recorder, to capture the light rays of the image and to record an image;

(d) store the image data into one or more storage repositories for recorded reference images, as a reference to which later images recorded by the method may be compared;

(e) select a position in any particular mineral grain that exhibits a variation in luminance between images recorded with different angular values between the polarization-axis of the linear-polarized light source and a predetermined axis that is orthogonal to the least dimension of the planar rock section (f) allow the passage of any amount of time, during which time the portable token may, or may not, be removed from the means of generating an image apparatus;

(g) repeat steps (a), (b) and (c) after the said passage of time, wherein the essentially transparent portable token is now subject to inquiry;

(h) store the image data into one or more storage repositories of data of recorded images, as image data to be subjected to inquiry by a comparison process;

(i) compare those recorded image data of the planar rock section that were recorded as a reference with those that were recorded for inquiry, by a comparison process, wherein the comparison process may use a computer-processor and memory;

(j) decide upon the identity and authenticity of the portable token based upon a matching correspondence, or lack thereof, between the reference image data and the image data of the subject of inquiry; and (k) indicate, as a binary logic output, the decision as to whether or not the planar rock section in the portable token is authentic.

* * * * *